(12) United States Patent
Livingstone et al.

(10) Patent No.: US 9,976,582 B2
(45) Date of Patent: May 22, 2018

(54) POSITION INDICATOR FOR A THREADED FIXING MEMBER

(71) Applicant: Hexchex Pty Ltd, Wangara, Western Australia (AU)

(72) Inventors: Alexander Livingstone, Mindarie (AU); Norman Livingstone, Mindarie (AU); Sean Bourne-Mullen, Ashby (AU)

(73) Assignee: Hexchex Pty Ltd, Wangara, Western Australia (AU)

( * ) Notice: Subject to any disclaimer, the term of this patent is extended or adjusted under 35 U.S.C. 154(b) by 2 days.

(21) Appl. No.: 14/784,039

(22) PCT Filed: Apr. 17, 2014

(86) PCT No.: PCT/AU2014/000449
§ 371 (c)(1),
(2) Date: Oct. 13, 2015

(87) PCT Pub. No.: WO2014/169345
PCT Pub. Date: Oct. 23, 2014

(65) Prior Publication Data
US 2016/0061238 A1   Mar. 3, 2016

(30) Foreign Application Priority Data

Apr. 18, 2013 (AU) ................. 2013901363

(51) Int. Cl.
*F16B 31/02* (2006.01)
*B60B 3/16* (2006.01)
(Continued)

(52) U.S. Cl.
CPC ............ *F16B 1/0071* (2013.01); *B60B 3/16* (2013.01); *F16B 31/02* (2013.01); *F16B 41/002* (2013.01);
(Continued)

(58) Field of Classification Search
CPC ............ B60B 3/16; B60B 2900/331; B60B 2900/3316; B60B 2900/541; F16B 1/00;
(Continued)

(56) References Cited

U.S. PATENT DOCUMENTS 6,270,302 B1 * 8/2001 Lyons ................. B60B 3/16
411/121
6,681,791 B1   1/2004 Chorney et al.
(Continued)

FOREIGN PATENT DOCUMENTS

GB    2406365 A      3/2005
GB    2446406 A *    8/2008 ............. F16B 31/02
(Continued)

OTHER PUBLICATIONS

International Search Report received in PCT/AU2014/000449, dated Jul. 1, 2014.

*Primary Examiner* — R. A. Smith
(74) *Attorney, Agent, or Firm* — Suzannah K. Sundby, Esq.; Canady + Lortz LLP

(57) ABSTRACT

A position indicator for mounting on a threaded fixing member such as a wheel nut or bolt, the position indicator comprising: (i) an annular body defining a void to receive the threaded fixing member, an inside surface adapted to engage with the threaded fixing member and prevent or impede relative rotational movement between the position indicator and the threaded fixing member, a first end comprising a male member and a second end comprising a female member; (ii) a clamping means operable in a single operation to reduce the size of the void, frictionally engage the male and female members and apply a clamping force to the threaded fixing member; and (iii) an indicating element for visually indicating the rotational position of the position indicator.

22 Claims, 7 Drawing Sheets

(51) Int. Cl.
   *F16B 1/00* (2006.01)
   *F16B 41/00* (2006.01)
(52) U.S. Cl.
   CPC ... *B60B 2900/331* (2013.01); *B60B 2900/541* (2013.01)
(58) Field of Classification Search
   CPC ........ F16B 1/0071; F16B 31/02; F16B 41/00; F16B 41/002
   USPC ........ 116/200, 212, 309, 328; 411/8, 11, 14; 73/761
   See application file for complete search history.

(56) References Cited

U.S. PATENT DOCUMENTS

| | | | | |
|---|---|---|---|---|
| 8,333,537 | B2* | 12/2012 | Rogers et al. ........ | F16B 31/02 301/35.622 |
| 8,337,129 | B2* | 12/2012 | Boyce et al. ........ | F16B 31/028 411/102 |
| 9,057,396 | B2* | 6/2015 | Prince .................. | F16B 39/101 |
| 9,353,776 | B2* | 5/2016 | Marczynski .......... | F16B 1/0071 |
| 9,618,028 | B2* | 4/2017 | Marczynski .......... | F16B 1/0071 |
| 2010/0206214 | A1* | 8/2010 | Marczynski .......... | F16B 1/0071 116/284 |
| 2010/0296892 | A1* | 11/2010 | Rogers et al. ........ | F16B 37/14 411/8 |

FOREIGN PATENT DOCUMENTS

| | | | | |
|---|---|---|---|---|
| GB | 2508152 | B * | 11/2014 | ............. F16B 31/02 |
| GB | 2539927 | A * | 1/2017 | ............. B60B 3/16 |
| WO | 2008122079 | A1 | 10/2008 | |

\* cited by examiner

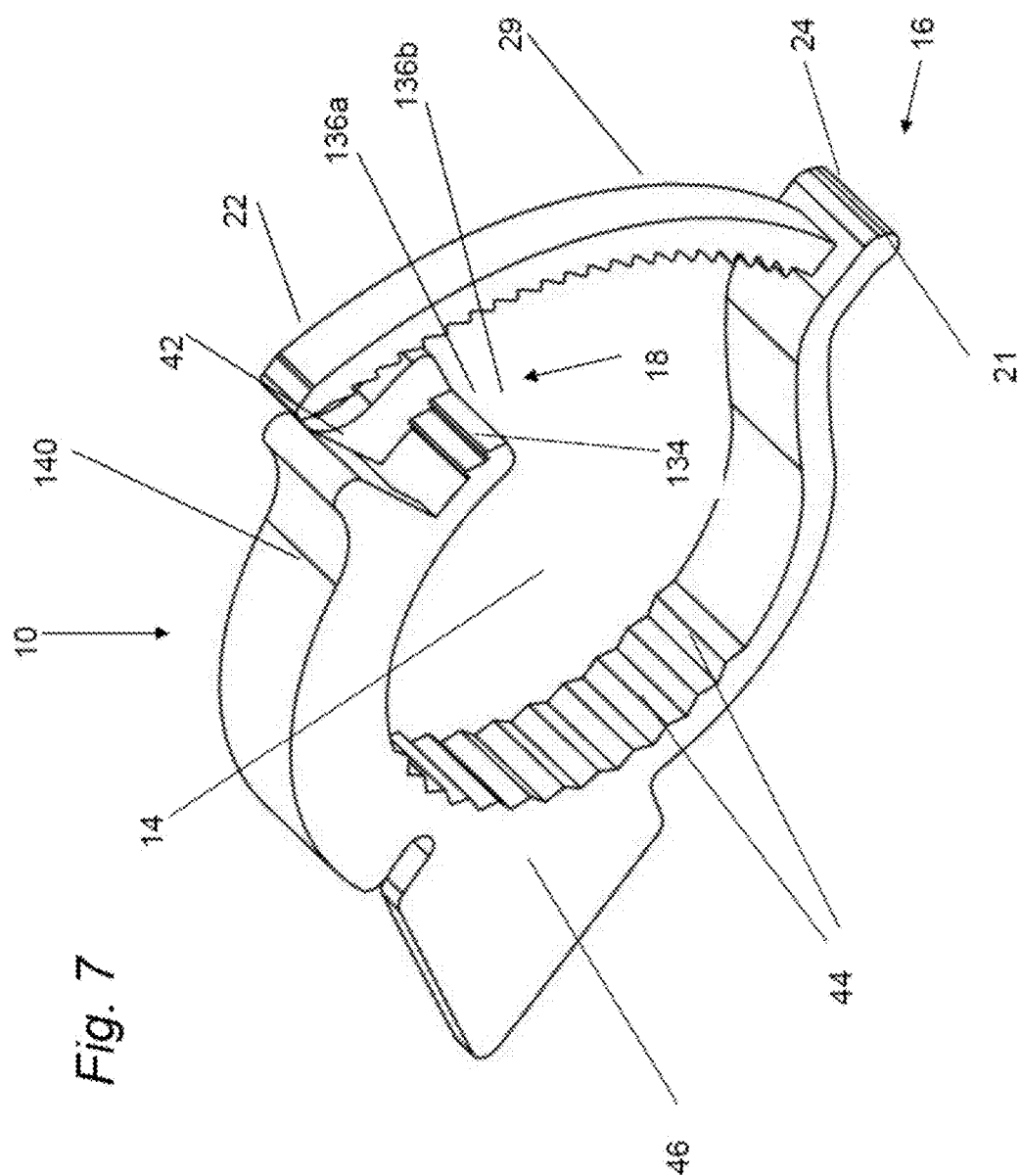

POSITION INDICATOR FOR A THREADED FIXING MEMBER

The present invention relates to a position indicator for a threaded fixing member such as a wheel nut or bolt. The present invention also relates to a method of fitting a position indicator to a threaded fixing member such as a wheel nut or bolt.

BACKGROUND TO THE INVENTION

Threaded fixing members such as nuts and bolts are used in a variety of applications to attach to objects together. During use and normal operating conditions threaded fixings can loosen and in some situations completely detach. The unintended loosening of a threaded fixing is at best inconvenient and in some situations can have disastrous implications.

Vehicle wheels are generally attached using a threaded fixing such as a wheel nut or bolt and proper wheel maintenance is especially critical on large transport vehicles, such as trucks, carrying heavy loads over extended distances where the wheels are put under considerable stress. Extreme operating conditions together with constant vibration and impacts require the wheel nuts to be checked regularly. If a wheel nut comes loose, the load will be transferred to the remaining nuts and studs which in turn increases their chance of failure. A badly maintained wheel with many loosening nuts could lead to a progressive stud failure with the wheel separating from vehicle. This extremely hazardous situation has been the cause for many accidents and even loss of life.

As part of routine maintenance, all nuts must re-torqued to specification. This is most often carried out using a large torque wrench and is a laborious task with considerable effort and time required. Some operators use a rattle gun on the nuts without loosening them first—a short cut that will over tighten the nuts causing premature wear and increased stress on the studs resulting in tensile failure.

A range of position indicators for wheel nuts are currently in use, particularly by trucking companies who often deploy them across their entire fleets. Furthermore, in some countries, authorities have made the use of position indicators compulsory.

The most commonly available position indicators are made to fit a given size nut and thus have a fixed internal size that is slightly smaller than the target nut size to ensure a tight fit therebetween. When applied, the plastic material stretches to accommodate the nuts dimensions. However, these position indicators can be difficult to put on and often require the use of special tools. Furthermore, the stretching/deformation of the material required to fit the devices can adversely impact on their service life and their performance due to the premature loss of their elasticity. This problem is exacerbated when the devices are re-used and/or when the operating conditions are particularly harsh, such as operating at extremes of temperature and/or where there is substantial exposure to the sun.

The need for a range of different sized position indicators to fit different sized nuts also has an adverse effect on manufacturing and distribution as many different products are required to fit the entire range of nut sizes used in the market. The cost to manufacture, ship, stock and manage a vast range of products, currently leads some suppliers and distributors to handle only the most common sizes. Unfortunately this creates scarcity for the less popular sizes driving up the costs as they must be ordered specifically.

To the extent that adjustable position indicators, that can fit more than one size of nut, have been developed they have been poorly designed, too expensive and/or have lacked the necessary functionality and ease of use to enable them to be successfully commercialised.

The present invention seeks to provide a position indicator that addresses or at least partially alleviates the aforementioned problems.

SUMMARY OF THE INVENTION

According to a first aspect, the present invention provides a position indicator for mounting on a threaded fixing member, the position indicator comprising:
  (i) an annular body defining a void to receive the threaded fixing member, an inside surface adapted to engage with the threaded fixing member and prevent or impede relative rotational movement between the position indicator and the threaded fixing member, a first end comprising a male member and a second end comprising a female member;
  (ii) a clamping means operable in a single operation to reduce the size of the void, frictionally engage the male and female members and apply a clamping force to the threaded fixing member; and
  (iii) an indicating element for visually indicating the rotational position of the position indicator.

The present invention also provides a position indicator for mounting on a threaded fixing member, the position indicator comprising:
  (i) an annular body defining a void to receive the threaded fixing member, an inside surface adapted to engage with the threaded fixing member and prevent or impede relative rotational movement between the position indicator and the threaded fixing member, a first end comprising a male member and a second end comprising a female member;
  (ii) a clamping means operable in a single operation to reduce the size of the void, frictionally engage the male and female members and apply a clamping force to the threaded fixing member; and
  (iii) an indicating element for visually indicating the rotational position of the position indicator; and
  (iv) means for disengaging the male and female members.

According to a second aspect, the present invention provides a method for fitting a position indicator to a threaded fixing member, the method comprising the steps of:
  (i) fitting the position indicator to the threaded fixing member according to a first mounting arrangement at which relative movement between the position indicator and the threaded fixing member is impeded but not prevented;
  (ii) rotating the position indicator to a desired position; and
  (iii) adjusting the position indicator to a second mounting arrangement at which relative movement between the position indicator and the threaded fixing member is prevented.

According to a third aspect, the present invention provides a method for fitting at least two position indicators of the present invention connected by a bridge that, in use, transfers rotational movement of one position indicator into opposite rotational movement of the other position indicator, to two threaded fixing members, the method comprising the steps of:
  (i) fitting the at least two position indicators to the threaded fixing members according to a first mounting arrangement at which relative movement between the position indicators and the threaded fixing members is impeded but not prevented;
(ii) rotating the position indicators to desired positions; and
(iii) adjusting the position indicators to a second mounting arrangement at which relative movement between the position indicators and the threaded fixing members is prevented.

BRIEF DESCRIPTION OF DRAWINGS

FIG. 7 is a schematic perspective view of a position indicator according to a third embodiment of the invention, in a ready for sale configuration.

DESCRIPTION OF THE INVENTION

Figure 1:
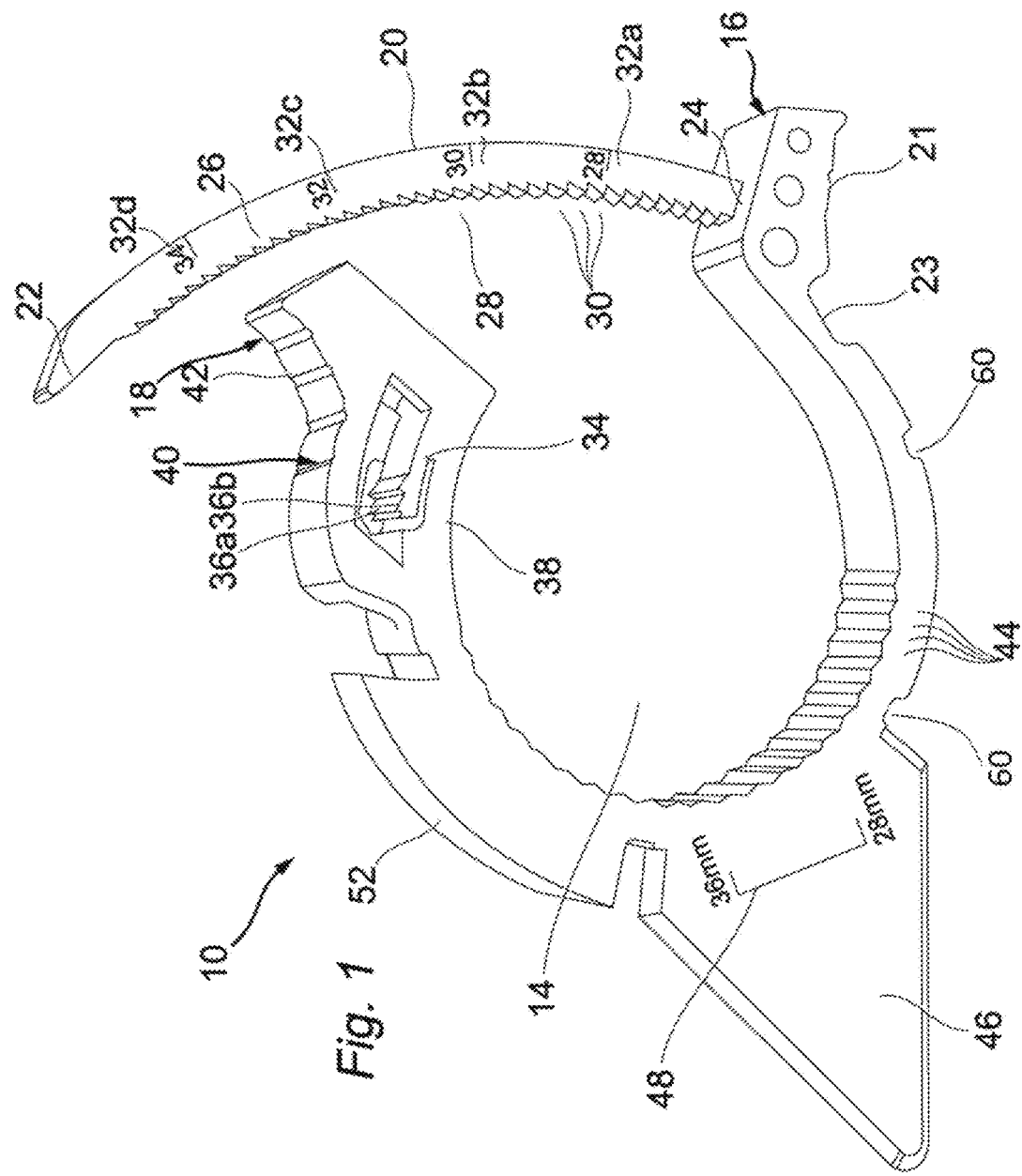
FIG. 1 is a schematic perspective view of a position indicator according to one embodiment of the invention, in a ready for sale configuration.

According to a first aspect, the present invention provides a position indicator for mounting on a threaded fixing member, the position indicator comprising:
(i) an annular body defining a void to receive the threaded fixing member, an inside surface adapted to engage with the threaded fixing member and prevent or impede relative rotational movement between the position indicator and the threaded fixing member, a first end comprising a male member and a second end comprising a female member;
(ii) a clamping means operable in a single operation to reduce the size of the void, frictionally engage the male and female members and apply a clamping force to the threaded fixing member; and
(iii) an indicating element for visually indicating the rotational position of the position indicator.

For the purposes of the present invention the term "position indicator" includes a rotation indicator. More preferably, the position indicator includes an indicator of local transformation from a fixed position or axis.

The threaded fixing member may be a nut or bolt such as a hexagonal nut or bolt, a wheel nut or other fasteners used in the assembly of heavy machinery. Unless otherwise indicated herein, the terms wheel nut and wheel bolt and nut and bolt are used interchangeably herein.

The body may be annular or generally ring shaped and/or at least defines a void that is generally circular or round. Preferably, the void is not generally elliptical.

Preferably, at least one of the first and second ends is free. In this regard, the annular or generally ring shaped body may be open or closed and may be adapted to transition between these states.

Preferably, the body is made of a deformable material so that it can conform to, or towards, the shape of the threaded fixing member on which it is mounted. Even more preferably, the body is made of resiliently deformable material, such that when it is removed from a threaded fixing member it returns to, or close to, its original shape and form. Preferably, the deformable material is suitable to enable the position indicator to be mounted conveniently and with sufficient strength to avoid its unintentional detachment during use but at the same time enable the position indicator to be conveniently removed, as required. Preferably, the body is formed of a material that has a flexural modulus of between 400 MPa-600 MPa, 700 MPa-1000 MPa or 450 MPa-1200 mPa. One example of this material is nylon 6 including one or more impact modifiers. Impact modifiers are added to achieve desired properties in engineering polymers such as PA12 (Nylon). PA12 is dimensionally stable and performs well at high temperature. Other suitable materials for the body include polypropylene, polyethylene, Hytrel (polyester) and elastomer materials with Shore D values around 65 such as Santoprene.

Preferably, the material is heat resistant. However, it is preferred that the material does melt at temperatures above 160° C. In this regard, the position indicator of the present invention is capable of identifying other problems with a wheel or other component or machine to which it is attached that result in elevated operating temperatures that but may otherwise go unnoticed. In these scenarios, melting of the position indicator will indicate another problem causing the elevated operating temperature so it can be addressed before a major failure. With respect to wheels, a truck wheel under extreme breaking conditions can reach over 150° C. with normal operating temperatures in the range of 60° C.-90° C.

The male member may be elongate and include a linear ratchet means on one surface adapted for frictional engagement with the female member. Preferably, the linear ratchet means comprises a plurality of projections or teeth.

Preferably, the male member comprises a tapered distal end to facilitate engagement with the female member.

Preferably, the male member includes indicia identifying at least one clamping point. Even more preferably, the indicia identify at least 2, 3 or 4 clamping points. In this regard, to suit different sized threaded fixing members, the position indicator will need to be clamped to varying extents to fit, as required. Preferably, the clamping points relate to the first mounting arrangement described more fully hereunder.

Preferably, the male member is of a predetermined length that avoids or reduces the need to trim or cut the male member when the position indicator is mounted on the threaded fixing member.

The male member may be arcuate. Preferably, the arcuate male member is angled such that when the clamping means is operated to reduce the size of the void, frictionally engage the male and female members and apply a clamping force to the threaded fixing member, the arcuate male member defines a path that follows the outside surface of the annular body.

The female member may comprise a pawl member for frictional engagement with the male member. Preferably, the pawl member includes a latch means that is biased toward an axis defined by the path of the male member when in frictional engagement with the pawl member and moving past the pawl member such that the latch means can frictionally engage with the male member and (i) permit movement of said male member in a forward direction and to (ii) arrest movement of said male member a reverse direction. Preferably, the movement is controlled by a shear engagement between the latch means and the male member.

The female member may comprise a housing that at least partially surrounds the female member and retains the male and female members in engagement.

Preferably, the housing defines an entry and an exit for the male member with the pawl member located therebetween.

Preferably, the body defines an inner surface adapted to engage with the threaded fixing member and prevent or impede relative movement, such as rotational movement, between the position indicator and the threaded fixing member when the position indicator is mounted on the threaded fixing member. In this regard, from an ease of use perspective, it is preferred that the position indicator is adapted to assume at least two mounting arrangements: a first mounting arrangement at which relative movement between the position indicator and the threaded fixing member is impeded but not prevented and a second mounting arrangement at which relative movement between the position indicator and the threaded fixing member is prevented. Preferably, the first and second mounting arrangements are a product of the amount of clamping force applied by the clamping means and it is expected that, in use, the position indicator will be partially clamped and mounted according to the first mounting arrangement, rotated on the threaded fixing member to adjust it to a desired position and then further clamped to adopt the second mounting arrangement.

The inner surface of the body may be shaped to increase the frictional engagement with an outer surface of the threaded fixing member. In this regard, the shape of the inner surface may be varied and includes a profile that incorporates one or more raised and/or recessed portions such as teeth and/or grooves. The raised or recessed portion may comprise the entire inner surface but it is preferred that it only comprises a portion of the inner surface. For example, less than half of the inner surface may be raised or recessed to engage with an outer surface of the threaded fixing member and in one particular form of the invention about one third of the inner surface is so shaped. The inner surface of the body may also include a variety of profiles adapted to frictionally engage with the outer surface of the threaded fixing member to varying extents. In this regard, different parts of the inner surface can incorporate recesses or grooves of differing profiles. The inner surface may also include one or more substantially smooth portions.

The inner surface may also include one or more convex portions. In this regard, a convex profile may further assist with the engagement between the position indicator and the threaded fixing member.

The clamping means allows for adjustment of the position indicator and thus enables the position indicator to be mounted on threaded fixing members across a range of sizes. Preferably, the clamping means is hand operable and even more preferably is finger operable such as by the index finger and thumb. In this regard, the clamping means may be operable by a pinching or squeezing motion.

Preferably, the clamping means comprises at least a first and a second grip point. Preferably, the grip points are opposed and define sections adapted to be finger operable. Preferably, the grip points are formed as opposed projections and include a contoured surface to ease their operation.

The grip points may be located on the body in an opposed relationship such that when the position indicator is in the second mounting arrangement they are adjacent to each other. In certain embodiments of the present invention the grip points are in abutment when the position indicator is in the second mounting arrangement.

Preferably, the first grip point is located on the outside of the annular body and adjacent the first end of the annular body. The first grip point may also be located proximal to the base of the male member of the first end of the body. Even more preferably, one of the grip points is located at the first end of the body. Preferably, this grip point is biased outward. Even more preferably, this grip point is spring mounted so as to be capable of a wider range of movement relative to the body of the position indicator. The first grip point may be a finger operable abutment member.

Preferably, the second grip point is located proximal to the second end of the body. Even more preferably, the second grip point is located adjacent to the second end of the annular body and on the outside of the annular body. In one particular form of the invention the second grip point is provided integrally with the female member. Preferably, the second grip point is a finger operable abutment member. In one form of the invention the second grip point is provided integrally with the female member.

The grip points may project out from the body. When the body is ring shaped or annular, the grip points may define an acute or an obtuse angle between the longitudinal axis of the grip point and the axis defined by the perimeter of the body.

Preferably, the indicating element comprises a pointer. The indicating element may also comprise an insert or attachment for altering the visual appearance of the indicating element. For example, it may be desired to customise the indicating element to increase its visibility or for cosmetic reasons—different coloured inserts would address this requirement. Different coloured inserts could also be used to indicate service status or intervals i.e. when the threaded fixing member was last checked or serviced or some other useful information. In this regard, following a service, a particular coloured insert may be applied to the indicating element to clearly demonstrate that the service has taken place. It may also be desired to include advertising material or other indicia for marketing purposes. Preferably, the insert or attachment can be readily attached and detached from the indicating element. In one form of the invention the insert or attachment is a snap-on or friction fit insert or attachment.

The indicating element may include indicia identifying a size or size range. For example, the indicia may comprise details of the size of the threaded fixing members to which the position indictor can be fitted.

To confer additional flex and contribute to the ability of the position indicator to conform to or towards the shape of the threaded fixing member and/or avoid undesirable deformation, it may further comprise one or more flex points. Preferably, the flex points are provided in the body. Even more preferably, the flex points comprise a section of the body with a higher propensity for deformation or flex relative to other parts of the body. One example of a flex point is a section of the body with a relatively thin cross-section. Another flex point could be created by using a material with different properties that confer additional flex on that section of the body. Preferably, the body includes one flex point adjacent to the indication element and even more preferably, the body includes two flex points, adjacent to each side of the indication element.

The position indicator may further comprise a retaining means for the male member. Preferably, the retaining means for the male member comprises a housing that is adapted to at least partially surround the end part or tail of the male member after it has passed through the female member. By holding the tail of the male member, the retaining means reduces the possibility of the tail becoming hooked or snagged and also improves the visual appearance of the product when in use. Preferably, the retaining means is supported from the body of the position indicator.

The present invention also provides a position indicator for mounting on a threaded fixing member, the position indicator comprising:
(i) an annular body defining a void to receive the threaded fixing member, an inside surface adapted to engage with the threaded fixing member and prevent or impede relative rotational movement between the position indicator and the threaded fixing member, a first end comprising a male member and a second end comprising a female member;
(ii) a clamping means operable in a single operation to reduce the size of the void, frictionally engage the male and female members and apply a clamping force to the threaded fixing member; and
(iii) an indicating element for visually indicating the rotational position of the position indicator; and
(iv) means for disengaging the male and female members.

The means for disengaging the male and female members allows for two way adjustment of the position indicator so it can be loosened or tightened as required. Thus, when the position indicator includes a means for disengaging the male and female members the position indicator can be conveniently removed for reuse or adjusted before being refitted to a threaded fixing member.

Preferably, the means for disengaging the male and female members is part of the clamping means. For example, when the female member is a pawl member, the means for disengaging the male and female member may comprise a pawl member for frictional engagement with the male member that includes a two way latch means that is biased towards the axis defined by the path of the male member, when in frictional engagement with the pawl member, and is also operable to be moved away from said axis such that the male and female members can be separated.

Preferably, the two-way latch means is hand or finger operable.

According to a second aspect, the present invention provides a method for fitting a position indicator to a threaded fixing member, the method comprising the steps of:
(i) fitting the position indicator to the threaded fixing member according to a first mounting arrangement at which relative movement between the position indicator and the threaded fixing member is impeded but not prevented;
(ii) rotating the position indicator to a desired position; and
(iii) adjusting the position indicator to a second mounting arrangement at which relative movement between the position indicator and the threaded fixing member is prevented.

Preferably, prior to fitting the position indicator according to step (i), the position indicator is partially clamped.

Preferably, the first and second mounting arrangements are hand or finger adjusted.

After the position indicator is adjusted to the second mounting arrangement it may be adjusted further using a tool such as hand grips, pliers or the like to further tighten the mounting arrangement between the position indicator and the threaded fixing member.

In some situations it may be beneficial to connect two or more position indicators together. Connecting the position indicators in this fashion can prevent a threaded fixing member that has loosened from loosening further. Thus, another aspect of the present invention provides at least two position indicators of the present invention connected by a bridge that, in use, transfers rotational movement of one position indicator into opposite rotational movement of the other position indicator.

Preferably, the position indicators and the bridge are provided integrally. The bridge may also be slidably mounted on the indicator element of each position indicator. More preferably, the bridge is slidably mounted on the indicator elements via compatible channels or grooves provided in the indicator elements that are configured to receive a pin member at each end of the bridge.

Preferably, the bridge is straight. Rotation of the fixing member alters the relationship angle of the bridge to visually indicate unwanted movement. This may include at least one bend or be "z" shaped. Preferably, the bridge includes a marker for indicating movement of the threaded fixing member.

According to a third aspect, the present invention provides a method for fitting at least two position indicators of the present invention connected by a bridge that, in use, transfers rotational movement of one position indicator into opposite rotational movement of the other position indicator, to two threaded fixing members, the method comprising the steps of:
(i) fitting the at least two position indicators to the threaded fixing members according to a first mounting arrangement at which relative movement between the position indicators and the threaded fixing members is impeded but not prevented;
(ii) rotating the position indicators to desired positions; and
(iii) adjusting the position indicators to a second mounting arrangement at which relative movement between the position indicators and the wheel nuts is prevented.

General

Those skilled in the art will appreciate that the invention described herein is susceptible to variations and modifications other than those specifically described. The invention includes all such variation and modifications. The invention also includes all of the steps and features referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness. None of the cited material or the information contained in that material should, however be understood to be common general knowledge.

The present invention is not to be limited in scope by any of the specific embodiments described herein. These embodiments are intended for the purpose of exemplification only. Functionally equivalent products and methods are clearly within the scope of the invention as described herein.

The invention described herein may include one or more range of values (e.g. size etc). A range of values will be understood to include all values within the range, including the values defining the range, and values adjacent to the range which lead to the same or substantially the same outcome as the values immediately adjacent to that value which defines the boundary to the range.

Throughout this specification, unless the context requires otherwise, the word "comprise" or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all technical terms used herein have the same meaning as commonly understood to one of ordinary skill in the art to which the invention belongs.

The present invention now will be described more fully hereinafter with reference to certain preferred embodiments of the invention. This invention may, however, be embodied in many different forms and should not be construed as limited to any of the embodiments set forth herein; rather, the embodiments are provided so that this disclosure will be thorough and complete, and will fully convey the scope of the invention to those skilled in the art.

DETAILED DESCRIPTION OF EMBODIMENTS OF THE INVENTION

FIGS. 1 to 5 depict a position indicator according to an embodiment of the present invention generally indicated by the numeral 10 for mounting on a threaded fixing member in the form of a wheel nut 12 of a vehicle such as a truck. When fitted, the position indicator enables the quick and efficient monitoring of the wheel nut 12 and in particular allows a user to determine whether wheel nut 12 has moved from its initial, tightened position.

In FIG. 1, the position indicator 10 is shown ready for use, for example, as it may be presented at the point of sale. The position indicator 10 has a generally annular or ring shaped body formed of nylon, such as nylon 6, or some other suitable material such as PA12 (nylon) and defines a void 14 for receiving the wheel nut 12. The ring shaped body is open and thus defines a first free end 16 comprising a male member in the form of tail 20 a second free end 18.

The first free end 16 comprises a first grip point 21 that is connected to the body of the position indicator 10 via a spring 23. The first grip point 21 is described in more detail below with respect to the clamping means. The tail 20 that projects from the first free end 16 is arcuate and includes a tapered distal end 22, a proximal end 24, two side faces 26 (one not shown), an inner face 28 and an outer face 29. The length of tail 20 is predetermined to minimise or avoid the need to trim or cut the tail 20 after the position indicator 10 has been fitted to the wheel nut 12.

The inner face 28 of the tail 20 includes a linear ratchet means in the form of a plurality of teeth 30 that extend along the length of the inner face 28. The side face 26 of the tail 20 includes indicia in the form of numbers 32a, 32b, 32c and 32d that identify different clamping points corresponding to the first mounting point for different sized wheel nuts 12 and assist with the use of the position indicator 10 that is described in more detail later herein.

The second free end 18 comprises a female member including a pawl 34. The pawl 34 includes a latch with teeth 36a, 36b biased toward an axis defined by the path of the tail 20 when in frictional engagement with the pawl 34. The pawl 34 permits movement of the tail 20 in a forward direction and incorporates an undercut 38 that renders the pawl 34 capable of movement away from the axis defined by the path of the tail 20. Movement of the pawl 34 away from the axis defined by the path of the tail 20 disengages the teeth 36a, 36b from the tail 20, allowing it to move in the reverse direction. In the absence of the undercut 38, no reverse movement is provided for, thus hampering the re-use of the position indicator. The female member further comprises a housing 40 that partially surrounds the pawl 34 and defines an entry and an exit for the tail 20 as well as a second grip point 42 that is discussed in more detail below with respect to the clamping means.

The body of the position indicator 10 also defines an inner surface adapted to engage with the outer surface of the wheel nut and including a plurality of grooves 44 that occupy about one third of the inner surface, with the remainder of the inner surface being smooth or substantially smooth. The body of the position indicator 10 also includes flex points 60 in the form of sections of the body with narrower cross sections than the remainder of the body of the position indicator 10.

The position indicator 10 also includes an indicating element in the form of a pointer 46 that projects outwardly from the body of the position indicator 10 and includes indicia in the form of a size range 48 of the wheel nut to which the position indicator 10 can be fitted.

The clamping means of the embodiment in FIGS. 1 to 5 comprises first and second grip points 21, 42 that are positioned in opposed relationship and configured to be conveniently operated to tighten the position indicator 10 by the index finger and thumb of a user working in a single pinching motion to move said grip points 21, 42 together and engage the teeth 30 on tail 20 with the teeth 36a, 36b on pawl 34. The operation of the clamping means is described in more detail with respect to FIGS. 2-5 hereunder.

Figure 2:
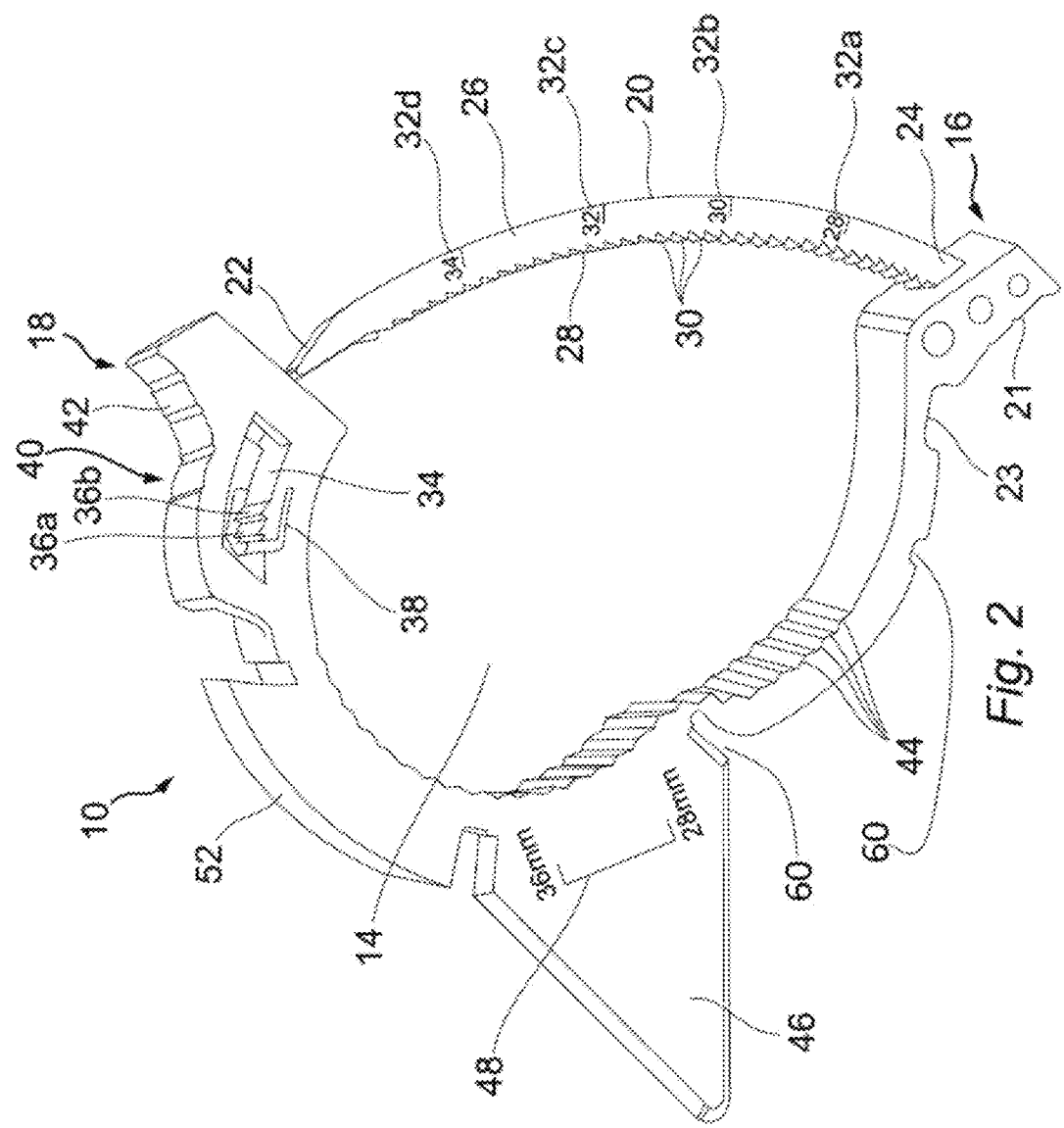
FIG. 2 is a schematic perspective view of the position indicator of FIG. 1, in a configuration where the position indicator is in use but not yet configured to be mounted on a threaded fixing member.

FIGS. 2-5 depict the operation of the position indicator 10 depicted in FIG. 1. In FIG. 2, the position indicator 10 is shown with the first and second grip points 21, 42 moved apart from each other enabling the tail 20 to be aligned for insertion into the entry in the housing 40. The spring 23 confers a preferred amount of flex for the first grip point 21 to be moved to a position where the tail 20 is aligned for insertion into the housing 40.

Figure 3:
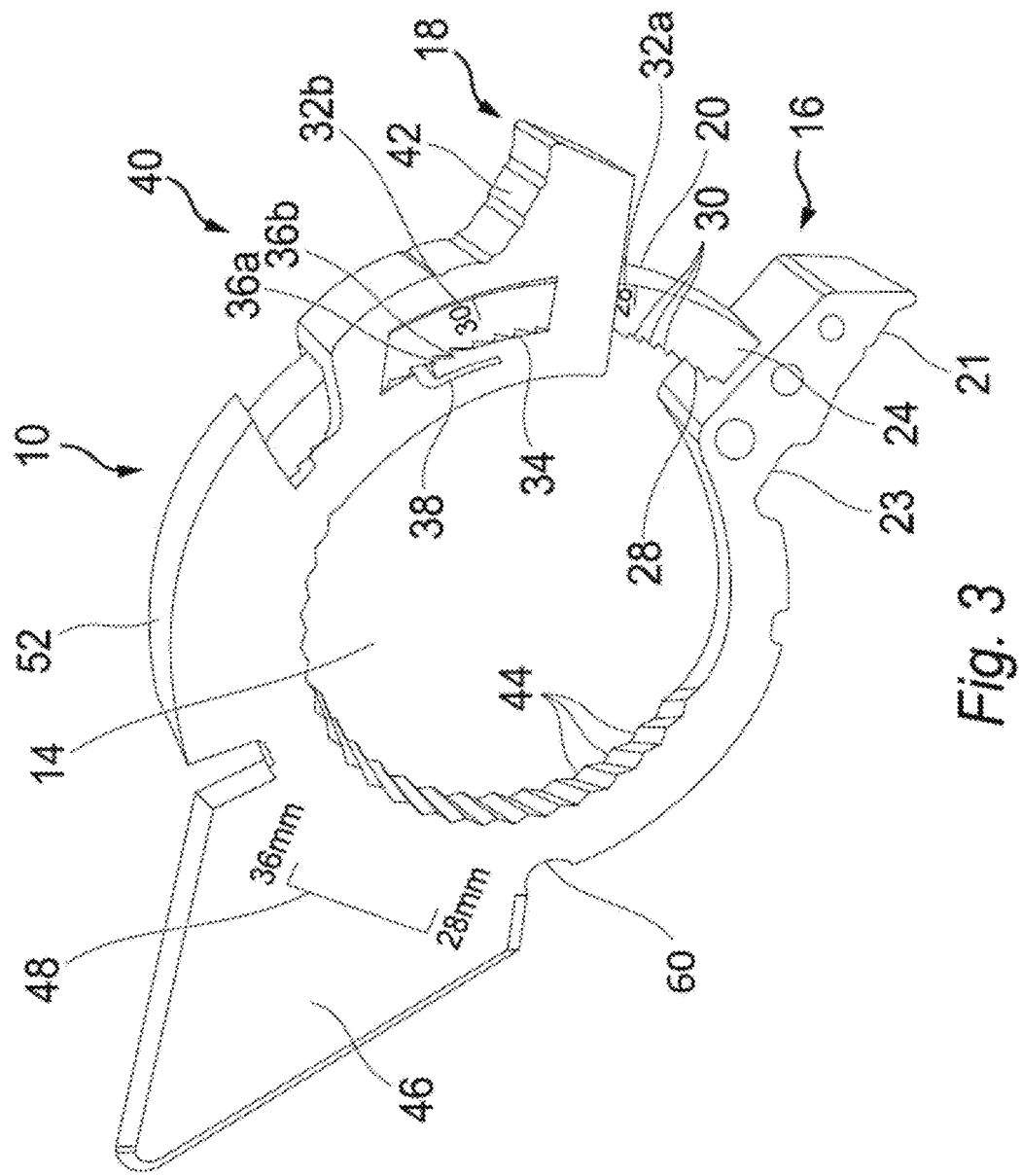
FIG. 3 is a schematic perspective view of the position indicator of FIG. 1 in a configuration suitable for mounting on a threaded fixing member.

In FIG. 3 the position indicator 10 is shown in the first mounting arrangement that would be set before the position indicator 10 is mounted on the wheel nut 12. In this regard, a user, knowing the size of the wheel nut 12, applies pressure by squeezing the first and second grip points 21, 42 together, thereby driving the tapered distal end 22 of tail 20 through the housing 40 so the teeth 30 on the inner face 28 of the tail 20 can engage with teeth 36a, 36b on pawl 34. In FIG. 3, the tail 20 is driven through the housing 40 until it reaches the size indicia 32a that relates to the size of wheel nut 12. At this stage the position indicator is ready to be mounted on the wheel nut 12 (see FIG. 4).

Figure 4:
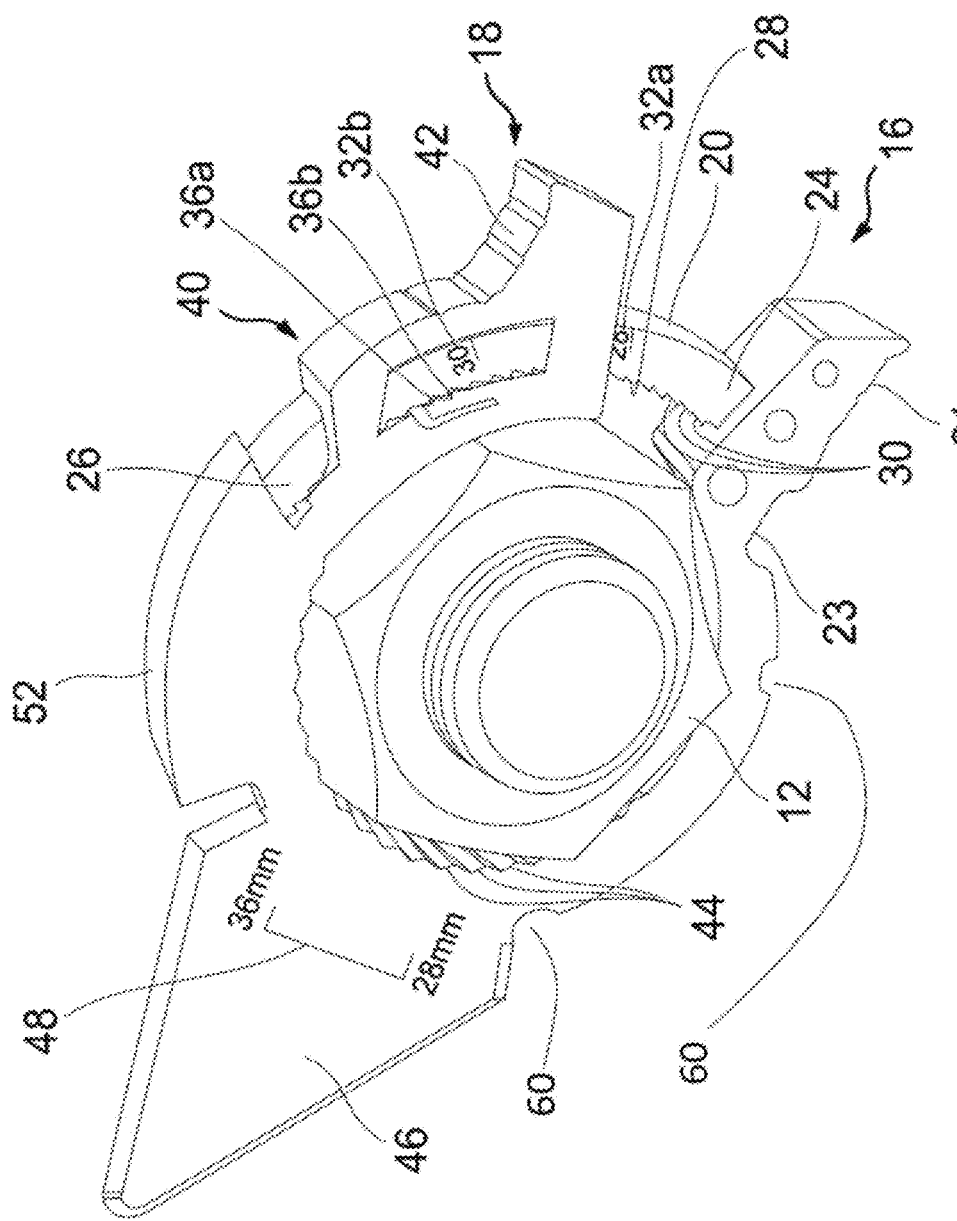
FIG. 4 is a schematic perspective view of the position indicator of FIG. 1 mounted on a threaded fixing member but still capable of relative rotational movement so that the correct orientation of the position indicator can be achieved.

FIG. 4 shows the position indicator 10 in FIG. 3 mounted on a nut 12. The position indicator 10 is in frictional engagement with the nut 12. Relative rotational movement between the position indicator 10 and the nut 12 is still possible but is impeded so that the position indicator 10 is still capable of being rotated around the nut 12 to a desirable location to ensure the pointer 46 is oriented correctly. Once the pointer 46 is oriented correctly, the position indicator 10 can be moved to the second mounting position (see FIG. 5)

Figure 5:
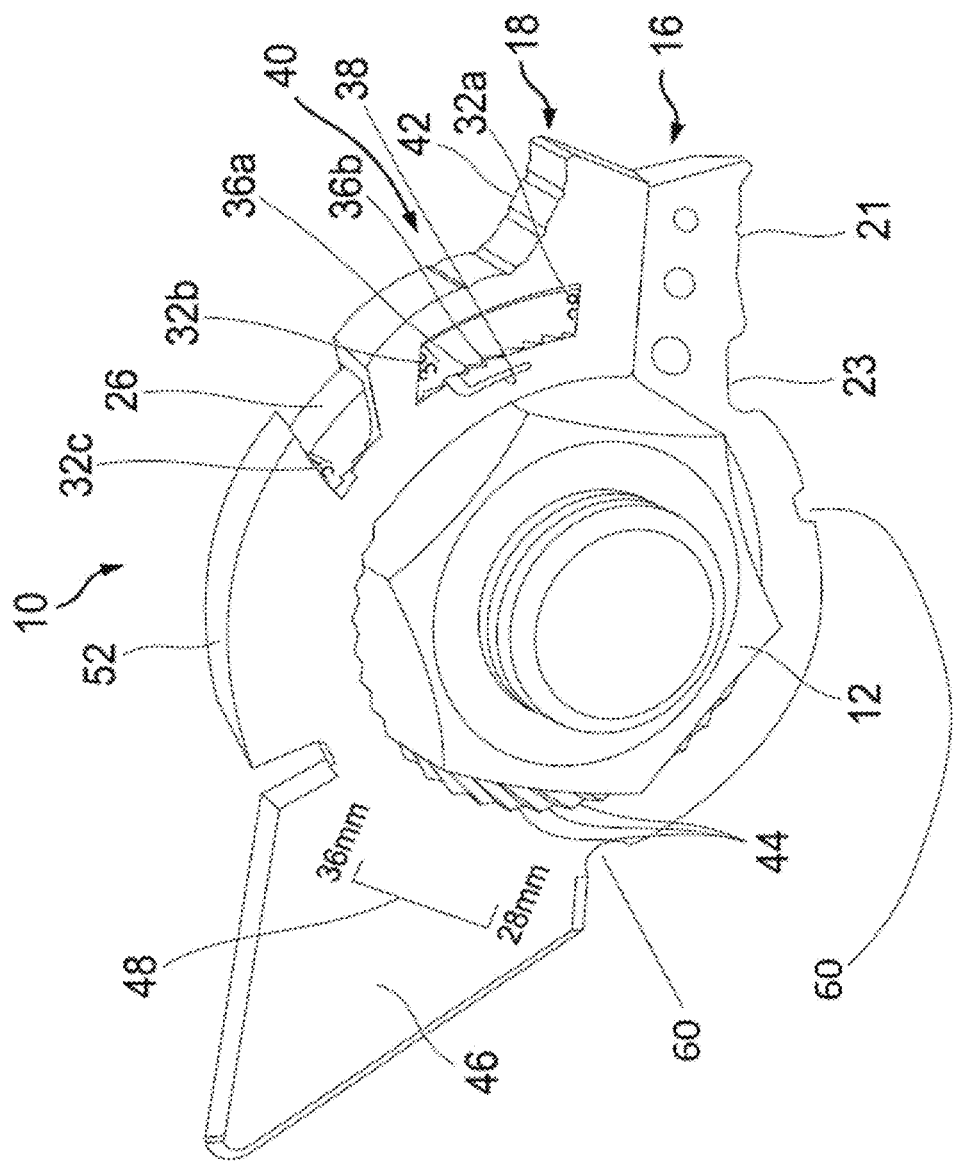
FIG. 5 is a schematic perspective view of the position indicator of FIG. 1 fixedly mounted on a threaded fixing member and ready for use.

FIG. 5 illustrates the position indicator 10, fully tightened, to assume the second mounting configuration where relative rotational movement between the position indicator 10 and the nut 12 is prevented. In this configuration, movement of the nut 12 will translate to a movement of the position indicator 10 that can be easily detected by reference to the pointer 46. The tail 20 is inserted to the point where the end of the tail 20 is retained in a retaining means in the form of a second housing 52 supported on the outside surface of the body of the position indicator 10. The arcuate shape of the tail 20 allows the tail 20 to define a path that follows the outside surface of the annular body of the position indicator 10. This nested arrangement of the tail 20 is cosmetically superior to having the free end of the tail exposed and reduces the chance that the free end of the tail 20 will be snagged or caught on another object, when in use. It will also be noted that when the position indicator 10 is fully tightened the inner surface of the annular body of the position indicator 10 contacts all the outside edges of the wheel nut 12, thus providing for a strong engagement between the position indicator 10 and the wheel nut 12.

If required, the position indicator 10 can be removed from the nut 12. Removal can be achieved by sliding the position indicator 10 off the nut 12. Once removed the position indicator 10 can be opened by operating the pawl 34 to move it away from the axis defined by the path of the tail 20 and disengage teeth 36*a*, 36*b* from the tail 20. Once the teeth 36*a*, 36*b* are disengaged the tail 20 can be withdrawn, allowing the position indicator 10 to assume the orientation in FIG. 1, 2 or 3 or 4.

The position indicator 10 can also be removed from the nut 12 by first operating the pawl 34 to move it away from the axis defined by the path of the tail 20 and disengage teeth 36*a*, 36*b* from the tail 20. Once the teeth 36*a*, 36*b* are disengaged the tail 20 can be withdrawn, allowing the position indicator 10 to assume the orientation in FIG. 1, 2 or 3, where it can be completely removed from the nut 12 or, to the orientation in FIG. 4 where it can be removed or remain mounted on the nut 12 but is capable of rotational movement relative to the nut 12.

Figure 6:
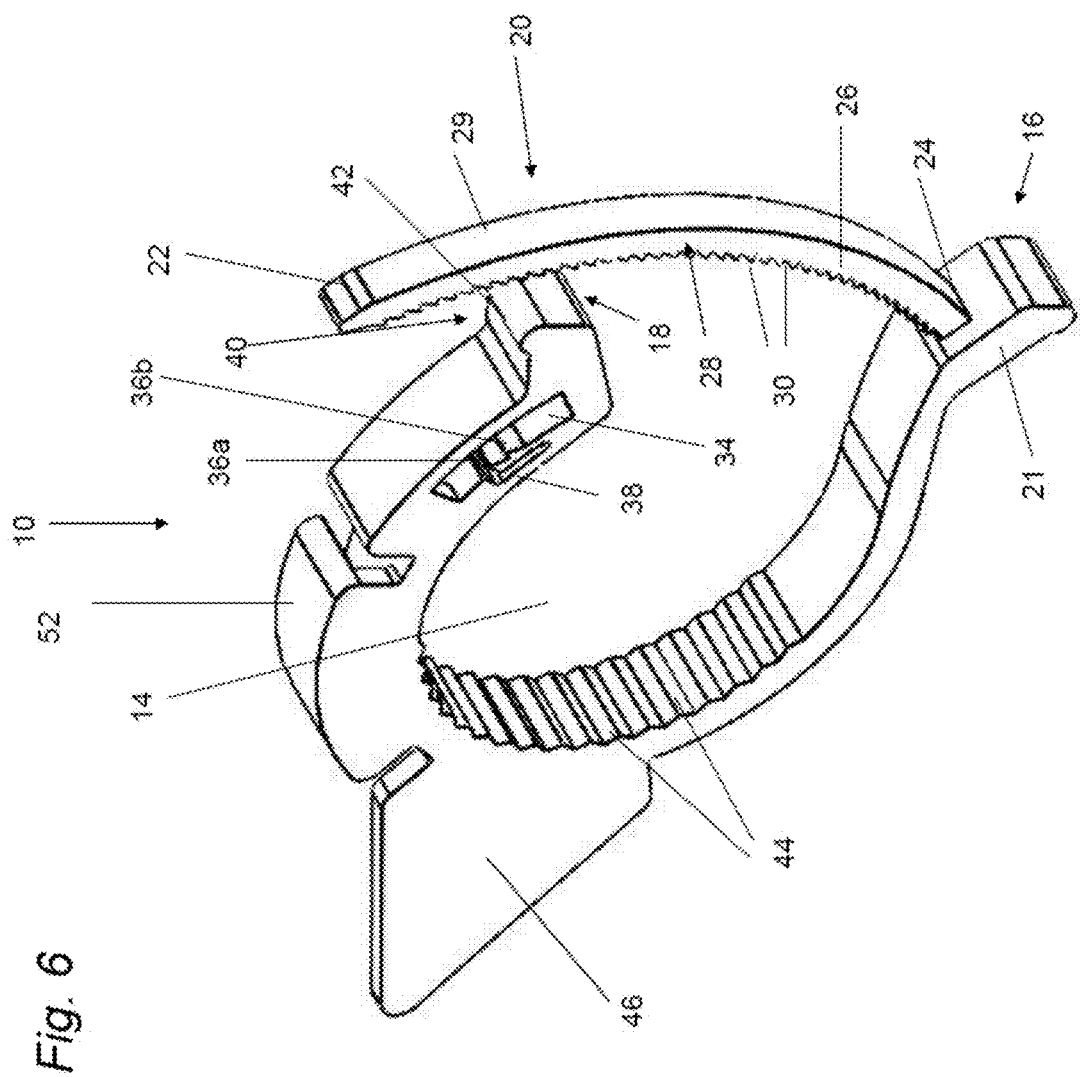
FIG. 6 is a schematic perspective view of a position indicator according to a second embodiment of the invention, in a ready for sale configuration.

FIG. 6 depicts a position indicator according to another embodiment of the present invention. The position indicator includes all the features of the embodiment in FIGS. 1-5 except has been moulded slightly differently. In particular, the body has been formed without flex points as the choice of material shape and configuration of the position indicator provides the required functional flexure. Like reference numerals have been used to identify the corresponding features in the position indicator in FIG. 6.

The operation of the position indicator in FIG. 6 is generally in accordance with that described in relation to the embodiment in FIGS. 1-5. The position indicator 10 is shown in a form ready for use as it be presented at the point of sale. To fit the position indicator 10, first and second grip points 21, 42 are moved apart from each other enabling the tail 20 to be aligned for insertion into the entry in the housing 40. The resilient characteristics of the plastics material used to form the device mean that a preferred amount of flex allows for convenient insertion of the tail 20 into the entry in the housing 40.

As the tail is forced through the housing 40 the teeth 30 on the inner face 28 of the tail 20 engage with teeth 36*a*, 36*b* on pawl 34. The tail 20 passes through the housing 40 until it reaches the desired position following which the position indicator is mounted on the wheel nut. The position indicator 10 can then be adjusted and used as detailed in relation to FIGS. 1 to 5.

FIG. 7 depicts a position indicator according to another embodiment of the present invention. The position indicator 10 is similar to the other embodiment in FIG. 6 except it includes a different housing 140. In particular, the housing 140 body has been formed so that the pawl 134, including teeth 136*a*, 136*b*, is located outside of the housing 140. When the part is fitted to the nut, the tail is secured in place by the housing where the top of the tail 29 is pressed against the underside face of the inner housing. The tail and pawl teeth are meshed together by the tension created by the downward pull of flexible part being clamped around the nut. This forms a secure mechanism that is held under tension until the part is removed from the nut and the part can "relax". This relaxed state allows the tail to release from the pawl teeth more easily as it is no longer under tension. Lifting the un-housed portion of the tail un-latches the teeth allowing a quick release type functionality. As with the embodiment in FIG. 6 like reference numerals have been used to identify the corresponding features in the position indicator in FIG. 7.

The operation of the position indicator in FIG. 7 is generally in accordance with that described in relation to the embodiment in FIG. 6.

The invention claimed is:

1. A rotation indicator for mounting on and indicating the rotational position of a nut, the rotation indicator comprising:
   (i) an annular body defining a void to receive the nut, an inside surface adapted to engage with the nut and prevent or impede relative rotational movement between the rotation indicator and the nut wherein said inside surface includes teeth or grooves, a first end comprising a male member and a second end comprising a female member;
   (ii) a clamping means operable in a single operation to reduce the size of the void, frictionally engage the male and female members and apply a clamping force to the nut; and
   (iii) an indicating element for visually indicating the rotational position of the nut,
   wherein the clamping means comprises first and second grip points on the annular body positioned in opposed relationship and defining sections adapted to be finger operable to engage the male and female members to apply the clamping force.

2. A rotation indicator according to claim 1, wherein the clamping means is operable by pinching or squeezing.

3. A rotation indicator according to claim 1, wherein the first grip point is provided on the outside of the annular body and adjacent the first end of the annular body.

4. A rotation indicator according to claim 3, wherein the first grip point is a finger operable abutment member.

5. A rotation indicator according to claim 4, wherein the second grip point is a finger operable abutment member.

6. A rotation indicator according to claim 1, wherein the second grip point is provided on the outside of the annular body and adjacent the second end of the annular body.

7. A rotation indicator according to claim 1, wherein the annular body is operable to be opened and hence render the first and second ends free.

8. A rotation indicator according to claim 1, wherein the annular body is resiliently deformable so that it can conform to, or towards, the shape of the nut on which it is mounted and return to its original shape and form when it is removed from the nut.

9. A rotation indicator according to claim 1, wherein the annular body is formed of a material that has a flexural modulus of 450 MPa to 1200 MPa.

10. A rotation indicator according to claim 1, wherein the male member is arcuate.

11. A rotation indicator according to claim 10, wherein the arcuate male member is angled such that when the clamping means is operated to reduce the size of the void, frictionally engage the male and female members and apply a clamping force to the nut, the arcuate male member defines a path that follows the outside surface of the annular body.

12. A rotation indicator according to claim 1, wherein the male member includes a linear ratchet means on one surface adapted for frictional engagement with the female member.

13. A rotation indicator according to claim 1, wherein the male member comprises a tapered distal end to facilitate engagement with the female member.

14. A rotation indicator according to claim 1, wherein the inside surface of the annular body further comprises a smooth portion.

15. A rotation indicator according to claim 1, wherein the female member comprises a pawl member for frictional engagement with the male member.

16. A rotation indicator according to claim 15, wherein the pawl member includes a latch means that is biased toward an axis defined by the path of the male member when in frictional engagement with the pawl member and moving past the pawl member such that the latch means can frictionally engage with the male member and (i) permit movement of said male member in a forward direction and (ii) arrest movement of said male member a reverse direction.

17. A rotation indicator according to claim 1, wherein, in use, the inner surface of the annular body contacts all of the outside edges of the nut.

18. A rotation indicator according to claim 1, wherein the indicating element comprises a pointer.

19. A rotation indicator according to claim 1, adapted to assume at least two mounting arrangements: a first mounting arrangement at which relative movement between the rotation indicator and the nut is impeded but not prevented and a second mounting arrangement at which relative movement between the rotation indicator and the nut is prevented.

20. A rotation indicator according to claim 1, wherein the annular body comprises at least two flex points to enable the rotation indicator to conform to or towards the shape of the nut and/or to avoid undesirable deformation.

21. A rotation indicator according to claim 1, wherein the inside surface of the annular body further comprises a smooth portion.

22. A rotation indicator according to claim 1, wherein the indicating element comprises an insert or attachment.

* * * * *